United States Patent [19]

Yamamoto et al.

[11] Patent Number: 5,433,915
[45] Date of Patent: Jul. 18, 1995

[54] MANUFACTURING METHOD OF COMPOSITE ARTICLES FROM PREPREGS WHICH AVOIDS INTERNAL DEFECTS

[75] Inventors: Tatsuya Yamamoto, Kakamigahara; Shinichi Shimizu, Kobe; Shunichi Bandoh, Kakamigahara; Hideki Miyabe, Kakamigahara; Seizi Itahana, Kakamigahara; Toshikazu Sana, Kakamigahara, all of Japan

[73] Assignee: Kawasaki Jukogyo Kabushiki Kaisha, Kobe, Japan

[21] Appl. No.: 112,800

[22] Filed: Aug. 27, 1993

[30] Foreign Application Priority Data

Sep. 1, 1992 [JP] Japan .................................. 4-257469

[51] Int. Cl.$^6$ ............................................. B29C 70/46
[52] U.S. Cl. ........................ 264/510; 264/102; 264/258; 425/405.1
[58] Field of Search ............ 264/510, 570, 258, 328.2, 264/257, 102; 425/405.1, 405.2

[56] References Cited

U.S. PATENT DOCUMENTS

| | | | |
|---|---|---|---|
| 3,907,960 | 9/1975 | Jakobsen | 264/258 |
| 4,810,444 | 3/1989 | Alberino et al. | 264/102 |
| 4,873,044 | 10/1989 | Epel | 264/257 |
| 5,023,041 | 6/1991 | Jones et al. | 264/510 |
| 5,225,135 | 7/1993 | Kia | 264/257 |

FOREIGN PATENT DOCUMENTS 3-284937  12/1991  Japan .

*Primary Examiner*—Jay H. Woo
*Assistant Examiner*—Robert B. Davis
*Attorney, Agent, or Firm*—Leydig, Voit & Mayer

[57] ABSTRACT

A manufacturing method of composite articles is provided by which it is possible to constantly mold thick composite articles as primary structure component parts for aircraft, such as rotor hubs of helicopters, which are highly accurate in dimensions and have a favorable internal quality with no internal defects such as molding cracks, voids and so forth. Therefore, this manufacturing method of composite articles includes the steps of laying up resin-impregnated reinforcing fiber materials in a molding cavity within a molding jig of a matched die type, evacuating the interior of the molding jig so that the resin-impregnated reinforcing fiber materials are under reduced pressure and thereafter closing and heating the dies of the molding cavity, causing the resin to overflow from the laid up materials into a trap located remote from the molding cavity, and molding the laid up materials inside of the molding jig.

25 Claims, 6 Drawing Sheets

MANUFACTURING METHOD OF COMPOSITE ARTICLES FROM PREPREGS WHICH AVOIDS INTERNAL DEFECTS

BACKGROUND OF THE INVENTION

1. Industrial Field of the Invention

The present invention relates to a method suitable for manufacturing thick composite articles which require high accuracy in dimensions, especially, high accuracy in plate thickness, and a high internal quality, for example, component parts such as a rotor hub of a rotor system in a helicopter made of composite materials.

2. Description of Related Art

Conventionally, most composite articles which require high strength, such as aircraft parts, have been molded in accordance with an autoclave molding method, as shown in FIG. 8. More specifically, resin-impregnated reinforcing fiber 3 (prepreg) is laid up in a molding jig 2 on a base plate 1. A pressing plate 4 is mounted on the prepreg 3, and covered with release film 5. The molding jig 2 is bagged by a breather 6, a bag film 7 and a vacuum sealant 8 on the base plate 1. After the interior of the bag film 7 is vacuumed, the prepreg 3 which is laminated in the molding jig 2 is heated to a predetermined temperature while an autoclave pressure is applied from the outside of the bag film 7. Thus, the prepreg 3 is molded.

In this autoclave molding method, a uniform pressing force applied to molding articles can be kept constant, so that molded articles of a favorable internal quality can be easily obtained. However, since the plate thickness varies owing to changes in the fiber area weight and/or the resin content of the material and so forth, high accuracy in the plate thickness can not be obtained constantly especially in the case of thick articles whose ply number is large. Therefore, this method is not suitable for component parts of a rotor system or the like which require highly accurate outer dimensions.

On the other hand, in order to obtain high accuracy in dimensions, molding is performed in accordance with a conventional matched-die method, as shown in FIG. 9. In this method, a sufficient pressure will not be uniformly applied to prepreg 3 after closing dies 48, so that voids 9 will be easily formed. Consequently, this method is not suitable for component parts of a rotor system or the like which require high strength properties.

In addition, as shown in FIG. 10, there is an RTM (Resin Transfer Molding) method in which a preform 10 of reinforcing fiber is set in a molding die 11, and resin 12 is injected into the molding die 11 under a pressure, to thereby obtain a molded article.

In this RTM method, it is necessary to inject the resin 12 in the molding die 11 so as to impregnate the preform 10 with the resin 12 uniformly. Therefore, as shown in FIG. 10, this method requires a complex injection apparatus comprising a pressing valve 13, an injection cylinder 14, a resin supply line 15, a resin draining line 16, a vacuuming line 17 and a vacuum pump 18.

Further, the kinds of resin employed in the RTM method are limited. More specifically, resin of low viscosity is preferable with respect to impregnation efficiency. However, the resin of low viscosity tends to be inferior in toughness, so that its products will be brittle. On the other hand, resin with favorable toughness tends to have high viscosity. Consequently, it easily induces inferior impregnation, and also, a high resin injection pressure is required, which results in a problem, for example, the regularity of the fiber is easily disarranged at the time of injection. This is particularly disadvantageous for parts which require a high fiber volume content (Vf).

Moreover, in the RTM method, it is difficult to produce a reinforcing fiber preform of a complicated shape and a layer structure. In other words, the RTM requires means for efficiently preparing a reinforcing fiber preform which includes reinforcing fiber arranged to be of a predetermined shape and thickness and in a predetermined fiber direction, and which will have less deformation, fiber disarrangement and fraying while it is handled. Such a preform for a part of a large complex shape and a complicated laminated structure, e.g., a rotor hub of a helicopter, cannot be prepared without difficulty.

Thus, the RTM method is not suitable for parts which are large, thick and complicated in shape, and which require high strength properties, such as a rotor hub of a helicopter.

SUMMARY OF THE INVENTION

It is therefore an object of the present invention to provide a manufacturing method of composite articles by which it is possible to constantly mold thick composite articles as primary structure parts for aircraft, such as rotor hubs of helicopters, which are highly accurate in dimensions and have no internal defects such as molding cracks, voids and so forth.

In order to solve the above-described problems, a manufacturing method of composite articles according to this invention is characterized in that it comprises the steps of laying up resin-impregnated reinforcing fiber materials (prepregs) in a molding jig of a matched die type, vacuuming the interior of the molding jig, if necessary, before closing dies so that the laid up materials will be in a vacuum state, closing and heating the molding jig, causing the resin to overflow from the laid up materials into a trap, and molding the laid up materials inside of the molding jig by pressing those materials from the outside through the resin which has overflown.

As a means for pressing the laid up materials inside of the molding jig from the outside through the overflow resin, there are a method of directly applying inert gas, such as $N_2$, to the overflow resin, a method of applying either gas or liquid to the overflow resin through a diaphragm, a method of operating a load controlled piston to apply a pressure to the overflow resin, and so forth.

In the case where inert gas such as $N_2$ is directly applied to the overflow resin to apply a pressure to it, a trap may be formed in the molding jig so that the overflow resin will pool in it.

In this method, when the amount of the overflow resin is small, resin may be supplied to the trap in advance, and the laid up materials inside of the molding jig may be pressed from the outside through the resin thus supplied. In consequence, when a small amount of the resin overflows, can be prevented from the gas or liquid used as the pressing means entering the laid up materials.

In the above-described manufacturing method of composite articles according to the present invention, the resin-impregnated reinforcing fiber materials (prepregs) are laid up in a molding jig of a matched die type, so that high accuracy in dimensions can be obtained. Also, since the interior of the molding jig is vacuumed before closing the dies, if necessary, the air which has entered the molding jig and vaporized gas of the solvent contained in the materials, and the like are removed. Further, the dies of the molding jig are closed and heated, causing the resin to overflow from the laid up materials into the trap. These laid up materials inside of the molding jig are molded while it is uniformly pressed from the outside through the resin which has overflown or the resin which has been fed into the trap in advance, so that composite articles of a favorable internal quality which have no internal defects such as molding cracks, voids and so forth can be obtained. Therefore, it is possible to obtain composite articles which can be applied as thick primary structure parts for aircraft which require fatigue strength and toughness because they repeatedly receive loads and which also require high accuracy in plate thickness.

DETAILED DESCRIPTION OF THE PREFERRED EMBODIMENTS

Figure 1:
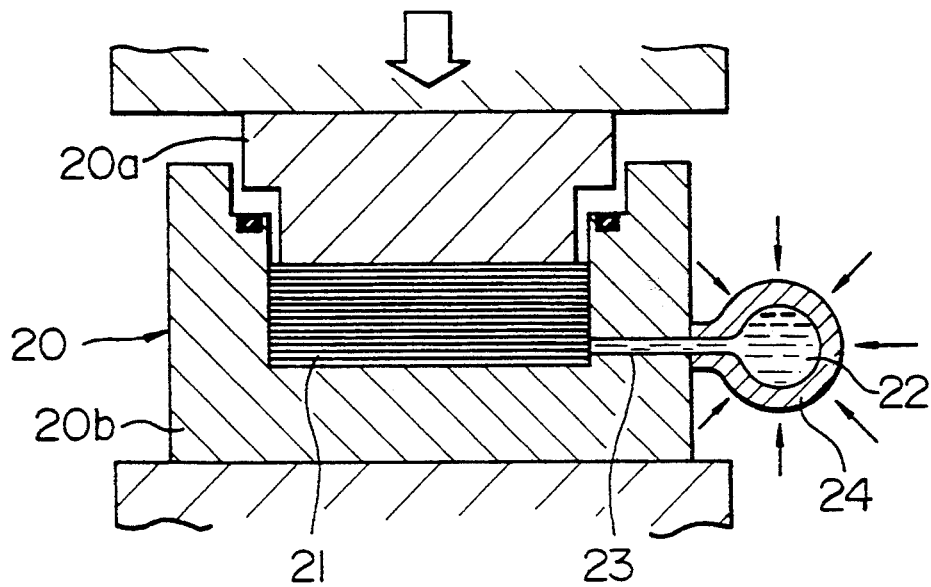
FIG. 1 is a diagram showing a fundamental embodiment of a manufacturing method of composite articles according to the present invention.

A fundamental embodiment of a manufacturing method of composite articles according to the present invention will now be described with reference to FIG. 1. Prepregs 21 which are reinforcing fiber materials impregnated with resin are laid up in a molding jig 20 of a matched die type. Then, the interior of the molding jig 20 is vacuumed through a gap between an upper die 20a and a lower die 20b so that the laid up prepregs 21 will be in a vacuum state. Next, by pressing the upper die 20a to close the dies of the molding jig 20, the resin 22 overflows from the laid up prepregs 21 into a trap 24 provided outside of the molding jig 20 through a conduit 23 formed in the lower die 20b. When pressure is applied, from the outside, to the resin 22 which has overflown into the trap 24, the prepregs 21 inside of the molding jig 20 are pressed and molded.

Figure 2:
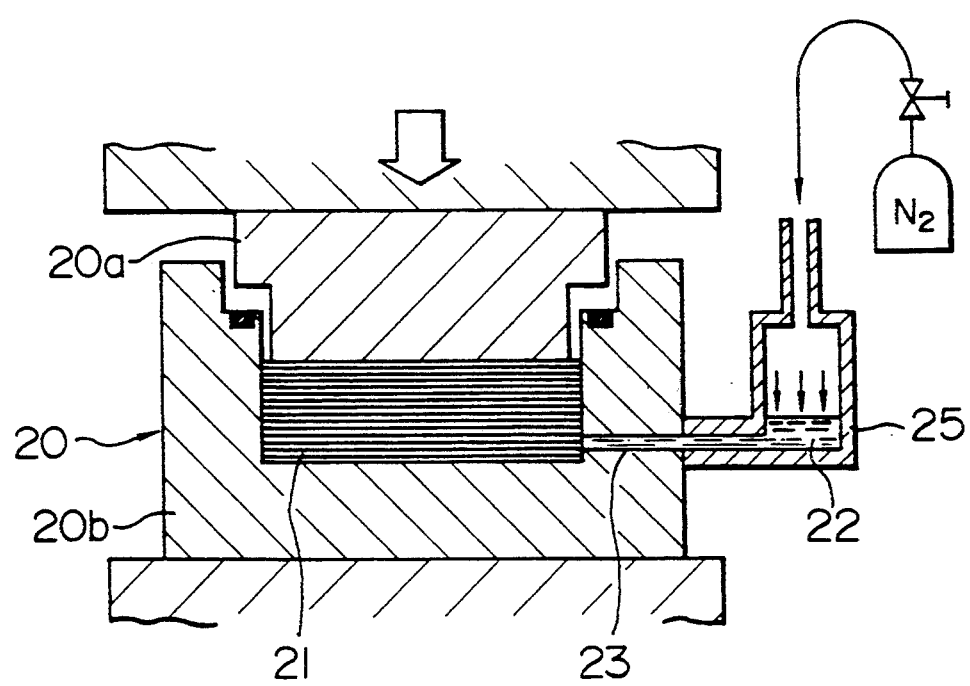
FIG. 2 is a diagram showing a method of pressing resin which has overflown or resin which has been supplied to a trap in advance by applying $N_2$ gas to it in the manufacturing method of composite articles according to the invention.
Figure 3:
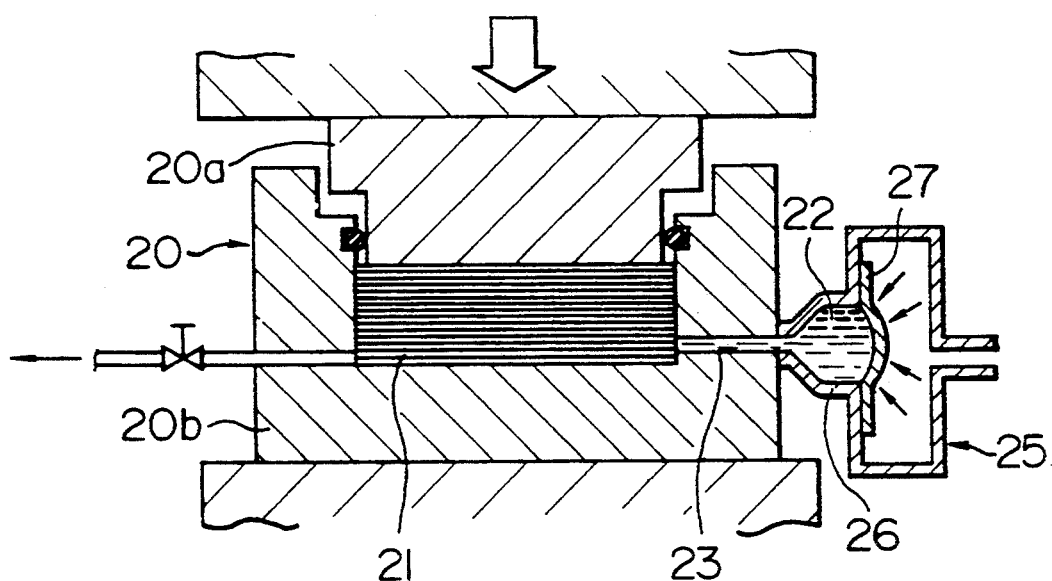
FIG. 3 is a diagram showing a method of pressing resin which has overflown or resin which has been supplied to a trap in advance by applying gas or liquid to it through a diaphragm in the manufacturing method of composite articles according to the invention.
Figure 4:
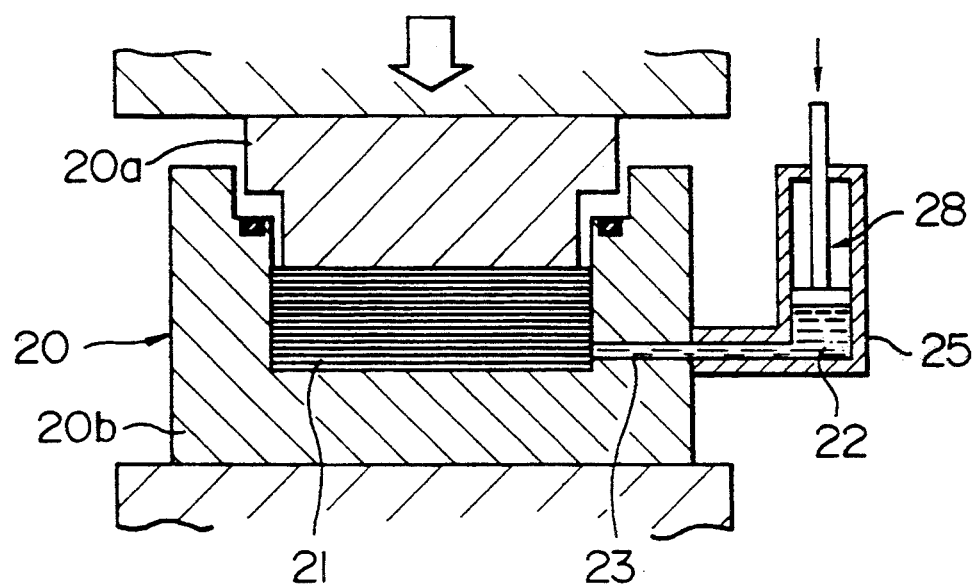
FIG. 4 is a diagram showing a method of pressing resin which has overflown or resin which has been supplied to a trap in advance by operating a load controlled piston in the manufacturing method of composite articles according to the invention.

As a means for pressing the prepregs 21 in the molding jig 20 from the outside through the overflow resin 22, there is a method of causing the resin 22 to overflow into a trap 25 provided outside through the passage 23 formed in the lower die 20b, as shown in FIG. 2, and applying pressure to the resin 22 which has overflown into the trap 25 by applying $N_2$ gas to the resin 22, thereby pressing the prepregs 21 inside of the molding jig 20. Further; as shown in FIG. 3, there is another method of providing a resin accumulating portion 26 at the inlet of the trap 25, closing the resin accumulating portion 26 by a diaphragm 27 inside of the trap 25, and applying pressure to the resin 22 which has been caused to overflow into the resin accumulating portion 26 by applying gas or liquid to it through the diaphragm 27, thereby pressing the prepregs 21 inside of the molding jig 20. In the case of this method, a seal between the upper die 20a and the lower die 20b is provided on the side surface of the die quite close to the laid up prepregs so that the resin will not overflow upwardly. Moreover, as shown in FIG. 4, there is also a method of applying pressure to the resin 22 which has overflown into the trap 25 by operating a load controlled piston 28, thereby pressing the prepregs 21 inside of the molding jig 20.

Figure 5:
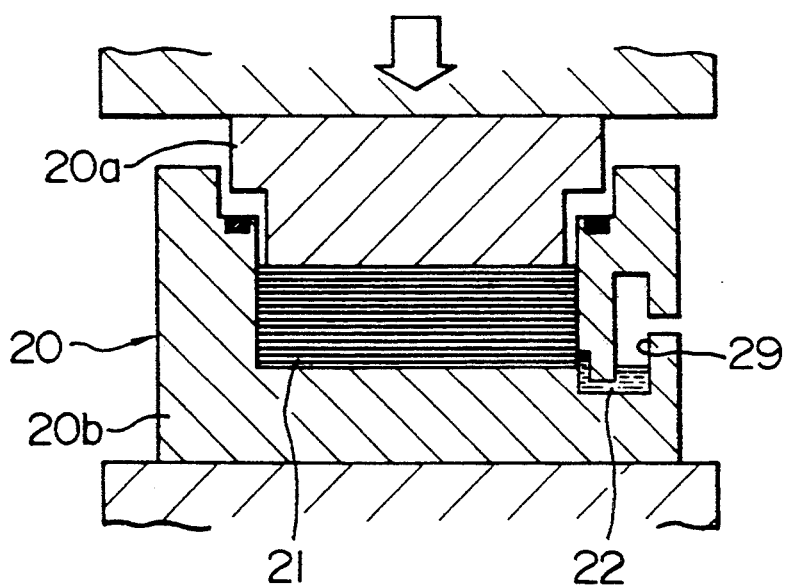
FIG. 5 is a diagram showing an example in which a trap is formed in a lower die of a molding jig in the manufacturing method of composite articles according to the invention.

In the case where $N_2$ gas is directly applied to the overflow resin 22 to apply pressure to it, a trap 29 may be formed in the lower die 20b of the molding jig 20, as shown in FIG. 5, so that the overflow resin 22 will pool in the trap 29.

Referring to FIGS. 1 to 5, when the amount of the overflow resin 22 is small, there will be employed a method of supplying resin 22 to the trap in advance, and pressing the prepregs 21 inside of the molding jig 20 from the outside through the resin 22 thus supplied.

Figure 6:
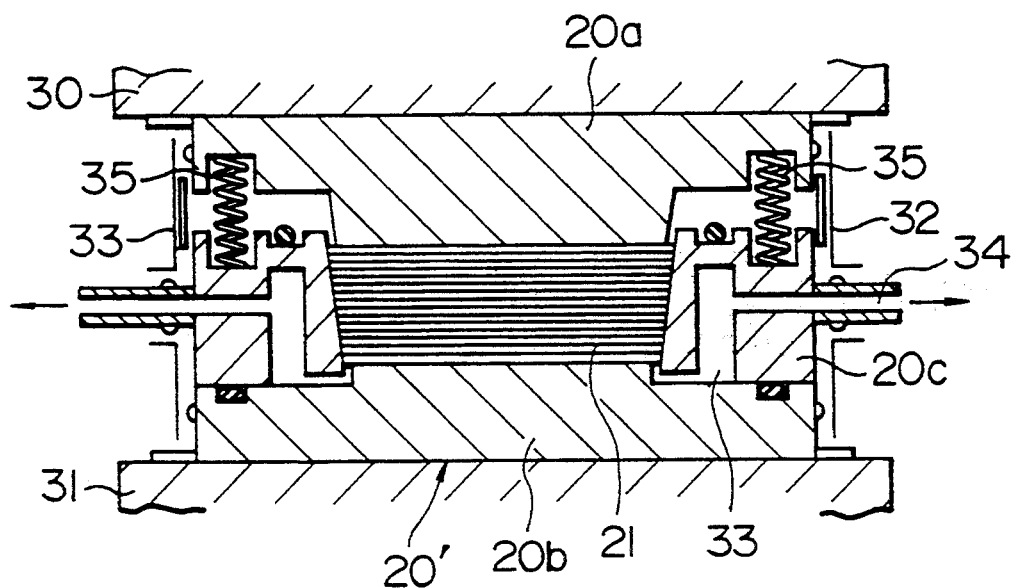
FIG. 6 is a diagram showing a molding jig in a state before closing its dies in one embodiment of a manufacturing method of composite articles according to the invention.
Figure 7:
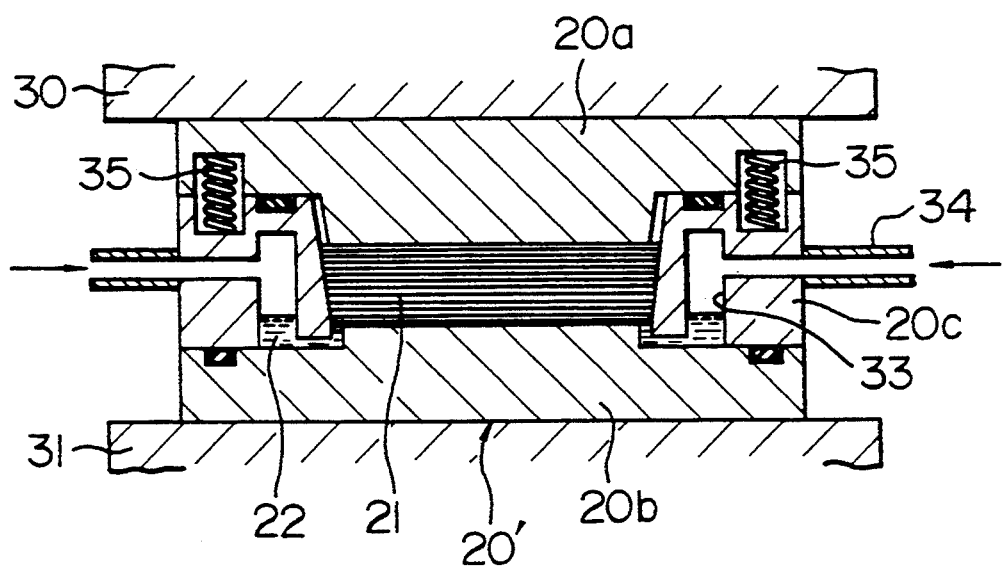
FIG. 7 is a diagram showing the molding jig of FIG. 6 in a state after closing its dies.
Figure 8:
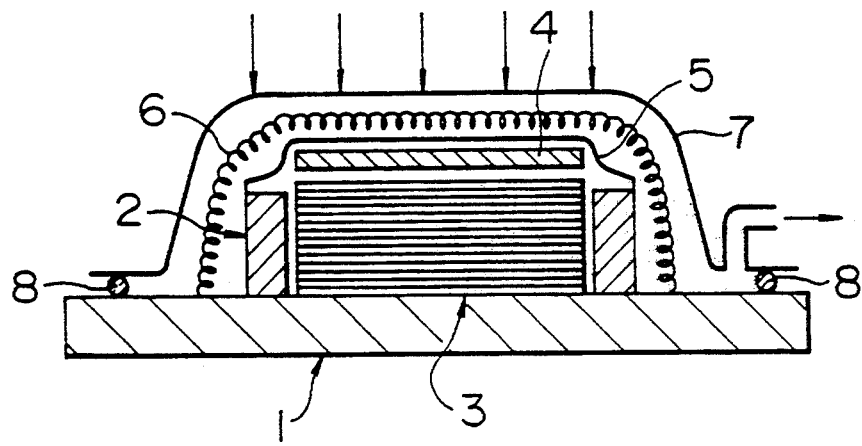
FIG. 8 is a diagram showing a manufacturing method of composite articles according to a conventional autoclave molding method.
Figure 9:
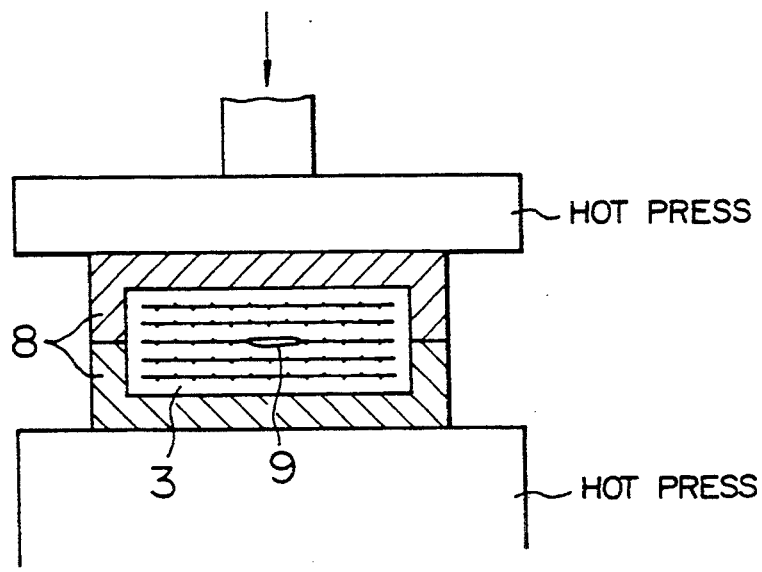
FIG. 9 is a diagram showing a manufacturing method of composite articles according to a conventional matched-die method.
Figure 10:
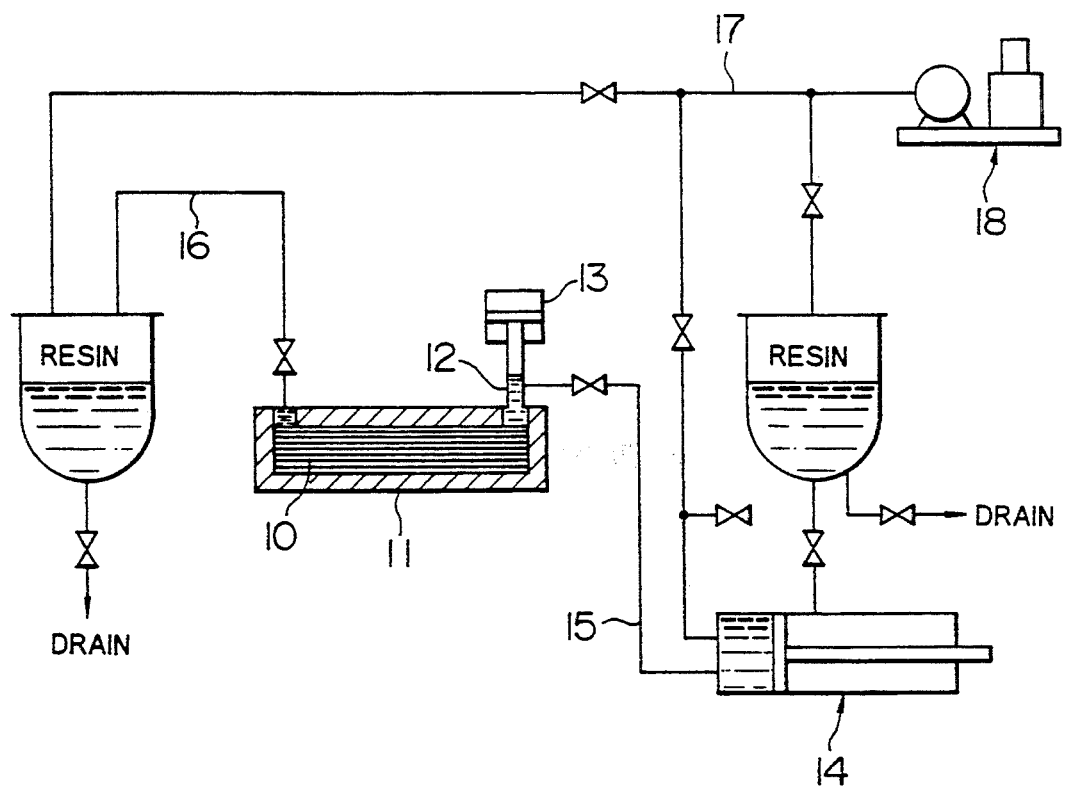
FIG. 10 is a diagram showing a manufacturing method of composite articles according to a conventional RTM method.

Next, one embodiment of a manufacturing method of composite articles according to the present invention will be described with reference to FIGS. 6 and 7. As shown in FIG. 6, prepregs 21 are laid up in a molding jig 20' of a matched die type which comprises an upper die 20a, a lower die 20b and a middle die 20c. After that, the molding jig 20' is set between upper and lower hot presses 30 and 31. Next, a vacuum bag 32 is attached to the molding jig 20' while maintaining the upper die 20a and the middle die 20c at a predetermined distance. Then, the inside of the laid up prepregs 21 is caused to be in a complete vacuum state by vacuuming through a pipe 34 which communicates with a trap 33 formed in the middle die 20c of the molding jig 20'. It should be noted that the vacuum bag 33 is not required when hot presses surrounded by a vacuum chamber are employed. Next, heating is performed by the hot presses 30 and 31 if necessary, so as to decrease the viscosity of the resin 22. The upper die 20a is pressed to abut against the middle die 20c, resisting the force of a spring 35, as shown in FIG. 7, to thereby close the dies of the molding jig 20', causing the resin 22 to overflow from the laid up prepregs 21 into the trap 33 formed in the middle die 20c. Then, heating is performed to a predetermined temperature, and a pressure is applied to the resin 22 in the trap 33 by applying $N_2$ gas to the resin 22 through the pipe 34 used for vacuuming, thus pressing and molding the prepregs 21 inside of the molding jig 20'.

When the amount of the overflow resin 22 is small, resin 22 is supplied to the trap 33 in advance, and then, molding is performed. In this case, metal fittings for vacuuming are attached to the vacuum bag provided on the molding jig 20' so as to effect vacuuming.

As described above, in the manufacturing method of composite articles according to the present invention, the prepregs 21 are laid up in the molding jig 20, 20' of the matched die type, so that high accuracy in dimensions, especially, high accuracy in plate thickness of thick composite articles can be obtained. Also, since the interior of the molding jig 20, 20' is vacuumed before closing the dies, if necessary, the air which has entered into the molding jig 20, 20' and vaporized gas of the solvent contained in the prepregs 21, and the like are removed. Further, the dies of the molding jig 20, 20' are closed and heated, causing the resin 22 to overflow from the laid up prepregs 21, and the prepregs 21 inside of the molding jig 20, 20' are molded while those are uniformly pressed from the outside through the resin 22 which has overflown, so that composite articles of a favorable internal quality which have no internal defects such as molding cracks, voids and so forth can be obtained. Therefore, it is possible to obtain composite articles which can be applied as thick primary structure parts for aircraft which require high fatigue strength and toughness because they receive cyclic loads and which also require high accuracy in plate thickness.

According to the manufacturing method of composite articles of this invention, as described heretofore, it is possible to perform molding which has advantages of both autoclave molding and matched-die molding, and thereby to constantly mold thick primary structure parts for aircraft which are highly accurate in dimensions and plate thickness and have a favorable internal quality with no internal defects such as molding cracks, voids and so forth. Moreover, the invention method is different from the conventional RTM method in that a special reinforcing fiber preform need not be prepared, and that ordinary prepregs can be used. Furthermore, since the reinforcing fiber materials impregnated with resin (prepregs) are laid up in the molding jig, the complicated lamination structure which enables the maximum use of properties of the fiber can be easily adopted, and also, the fiber volume content (Vf) can be increased. Besides, the reinforcing fiber materials are impregnated with the resin in advance so that high-efficiency resin can be used as desired without being restricted by the viscosity and so forth of the resin. Thus, it is possible to obtain composite articles having higher efficiency, and to prevent the occurrence of inferior resin impregnation and such troubles.

What is claimed is:

1. A manufacturing method of composite articles, comprising sequentially
   (a) laying up a reinforcing fiber material impregnated with resin in a molding cavity within a molding jig of a matched die type,
   (b) evacuating the interior of the molding jig so that said resin impregnated reinforcing material is under reduced pressure,
   (c) closing and heating dies defining the molding cavity and thereby causing the resin to overflow from the laid up material in the molding cavity into a trap located remote from the molding cavity, and
   (d) applying pressure to the resin in the trap and thereby molding the laid up materials inside of the molding cavity.

2. A manufacturing method of composite articles according to claim 1, wherein inert gas is applied directly to the resin in said trap to press the laid up materials inside of said molding cavity.

3. A manufacturing method of composite articles according to claim 1, wherein, said trap in which the resin is accumulated is formed in said molding jig.

4. A manufacturing method of composite articles according to claim 2 wherein said inert gas is $N_2$.

5. A manufacturing method of composite articles, comprising sequentially
   (a) laying up a reinforcing fiber material impregnated with resin in a molding cavity within a molding jig of a matched die type,
   (b) evacuating the interior of the molding jig so that said resin impregnated reinforcing material is under reduced pressure,
   (c) closing and heating dies defining the molding cavity and thereby causing the resin to overflow from the laid up material in the molding cavity into a trap located remote from the molding cavity, and
   (d) applying pressure to the resin in the trap and thereby molding the laid up material inside of the molding cavity, wherein resin is placed in said trap prior to closing and heating dies of the molding cavity.

6. A manufacturing method of composite articles according to claim 1 wherein a diaphragm is in contact with the resin in said trap and pressure is applied to said diaphragm with either gas or liquid.

7. A manufacturing method of composite articles according to claim 1 wherein a piston is in contact with the resin in said trap and pressure is applied by said piston.

8. A manufacturing method of composite articles according to claim 5 wherein said trap in which the resin is accumulated is formed in said molding jig.

9. A manufacturing method of composite articles according to claim 1 wherein said trap is remote from said molding jig.

10. A manufacturing method of composite articles according to claim 9 wherein inert gas is applied directly to the resin in said trap to press the laid up materials in said molding cavity.

11. A manufacturing method of composite articles according to claim 7 wherein said piston is a load controlled piston.

12. A manufacturing method of composite articles according to claim 5 wherein said trap is remote from said molding jig.

13. A manufacturing method of composite articles according to claim 1 wherein heating is performed both before and after closing the dies of the molding cavity.

14. A manufacturing method of composite articles according to claim 10 wherein said inert gas is $N_2$.

15. A manufacturing method of composite articles according to claim 9 wherein a diaphragm is in contact with the resin in said trap and pressure is applied to said diaphragm with either gas or liquid.

16. A manufacturing method of composite articles according to claim 5 wherein heating is performed both before and after closing the dies of the molding cavity.

17. A manufacturing method of composite articles according to claim 12 wherein inert gas is applied directly to the resin in said trap to press the laid up materials inside of said molding jig.

18. A manufacturing method of composite articles according to claim 17 wherein said inert gas is $N_2$.

19. A manufacturing method of composite articles according to claim 12 wherein a diaphragm is in contact with the resin in said trap and pressure is applied to said diaphragm with either gas or liquid.

20. A manufacturing method of composite articles according to claim 9 wherein a piston is in contact with the resin in said trap and pressure is applied by said piston.

21. A manufacturing method of composite articles according to claim 12 wherein a piston is in contact with the resin in said trap and pressure is applied by said piston.

22. A manufacturing method of composite articles according to claim 20 wherein said piston is a load controlled piston.

23. A manufacturing method of composite articles according to claim 21 wherein said piston is a load controlled piston. reinforcing fiber materials are under reduced pressure and thereafter 24. A manufacturing method of composite articles according to claim 1 wherein a conduit is provided between the molding cavity and the trap.

25. A manufacturing method of composite articles according to claim 5 wherein a conduit is provided between the molding cavity and the trap.

* * * * *

UNITED STATES PATENT AND TRADEMARK OFFICE
CERTIFICATE OF CORRECTION

PATENT NO.　：　5,433,915
DATED　　　：　July 18, 1995
INVENTOR(S) ：　Yamamoto et al.

It is certified that error appears in the above-indentified patent and that said Letters Patent is hereby corrected as shown below:

Column 8, Line 8, delete "reinforcing fiber materials are under";

Line 9, delete "reduced pressure and thereafter".

Signed and Sealed this

Twelfth Day of December, 1995

Attest:

BRUCE LEHMAN

Attesting Officer

Commissioner of Patents and Trademarks